(12) United States Patent
Kulkarni

(10) Patent No.: US 11,424,089 B2
(45) Date of Patent: Aug. 23, 2022

(54) HEAT-ABSORBING-AND-DISSIPATING JACKET FOR A TERMINAL OF AN ELECTRICAL DEVICE

(71) Applicant: Appleton Grp LLC, Rosemont, IL (US)

(72) Inventor: Amit S. Kulkarni, Pune (IN)

(73) Assignee: Appleton Grp LLC, Rosemont, IL (US)

( * ) Notice: Subject to any disclaimer, the term of this patent is extended or adjusted under 35 U.S.C. 154(b) by 0 days.

(21) Appl. No.: 16/752,011

(22) Filed: Jan. 24, 2020

(65) Prior Publication Data
US 2020/0243274 A1 Jul. 30, 2020

(30) Foreign Application Priority Data

Jan. 29, 2019 (IN) .............................. 201921003495

(51) Int. Cl.
*H01H 9/52* (2006.01)
*H02B 1/56* (2006.01)

(52) U.S. Cl.
CPC .............. *H01H 9/52* (2013.01); *H02B 1/565* (2013.01)

(58) Field of Classification Search
CPC ... H02M 7/003; H01H 71/00; H01H 71/0264; H01H 9/22; H01H 71/02; H01H 71/025;
(Continued)

(56) References Cited

U.S. PATENT DOCUMENTS 1,522,926 A * 1/1925 Wadsworth ............ H02G 3/086
361/672
2,065,356 A * 12/1936 Von Hoorn ............ H01H 73/18
200/297
(Continued)

FOREIGN PATENT DOCUMENTS

JP 2017107658 A * 6/2017
KR 20090006392 U * 6/2009
(Continued)

OTHER PUBLICATIONS

JP2017107658, Osada, Penetrating terminal block and electrical machine, Jun. 15, 2017, PE2E search translation (Year: 2017).*
(Continued)

*Primary Examiner* — Michael A Matey
(74) *Attorney, Agent, or Firm* — McDonnell Boehnen Hulbert & Berghoff LLP

(57) ABSTRACT

The present disclosure envisages a heat-absorbing-and-dissipating jacket (80) for a terminal (100) of an electrical device (1000). The jacket has a body (81) configured to at least partially contour walls of the housing (10) of the terminal (100) and the jacket is made of a heat-absorbing-and-dissipating material. The body (81) of the jacket has a lower portion (86) extending operatively below the housing (10) of the terminal (100). The body (81) of the jacket also has an upper portion (88) extending operatively above the housing (10) of the terminal (100). The jacket (80) of the present disclosure is a cost-effective means which allows maximum heat absorption and dissipation from an enclosed electrical device and can be incorporated in an existing design of an electrical device.

11 Claims, 14 Drawing Sheets

(58) Field of Classification Search
CPC ...... H01H 71/08; H01H 23/04; H01H 33/122; H01H 9/0044; H01H 9/02; H01H 9/0264; H01H 9/0271; H01H 9/20; H01H 9/26; H01H 9/52; H05K 7/2089; H05K 5/069; H05K 7/1427; H05K 7/20; H01M 10/425; H01M 2/30; H01M 8/2475; G01R 1/0416; H01R 9/16; H02B 1/24; H02B 1/30; H02B 13/0352; H02B 1/056; H02B 1/26; H02B 1/42; H02B 1/44; H02B 1/565

See application file for complete search history.

(56) References Cited

U.S. PATENT DOCUMENTS

| | | | | |
|---|---|---|---|---|
| 2,780,793 | A * | 2/1957 | Gambale | H01R 4/62 439/812 |
| 3,015,084 | A * | 12/1961 | Gribble | H01R 4/366 439/812 |
| 3,258,733 | A * | 6/1966 | Elm | H01R 4/2454 439/400 |
| 3,864,005 | A * | 2/1975 | Klein | H01R 4/363 24/115 N |
| 5,149,278 | A * | 9/1992 | Waas | H01R 4/2408 439/412 |
| 5,206,789 | A * | 4/1993 | Barbry | H01H 71/08 439/810 |
| 5,606,298 | A * | 2/1997 | Weiser | H01H 50/14 335/83 |
| 5,634,811 | A * | 6/1997 | Heng | H01R 4/2408 439/412 |
| 6,062,919 | A * | 5/2000 | Trafton | H01R 13/187 439/843 |
| 6,172,586 | B1 * | 1/2001 | Ferree | H01H 71/08 335/202 |
| 6,287,148 | B1 * | 9/2001 | Huang | H01R 13/6593 439/607.41 |
| 6,296,498 | B1 * | 10/2001 | Ross | H01R 25/145 439/115 |
| 6,338,658 | B1 * | 1/2002 | Sweeney | H01R 4/36 439/810 |
| 6,443,783 | B1 * | 9/2002 | Beadle | H01R 9/2425 439/814 |
| 6,529,112 | B1 * | 3/2003 | Leone | H01R 4/36 439/810 |
| 6,602,091 | B2 * | 8/2003 | Belady | H01R 13/533 439/485 |
| 6,624,375 | B2 * | 9/2003 | Leone | H01H 9/342 218/155 |
| 6,719,593 | B2 * | 4/2004 | Garcia | H01R 4/363 361/600 |
| 7,009,132 | B1 * | 3/2006 | Shea | H01H 9/342 218/155 |
| 7,084,727 | B2 * | 8/2006 | Bauer | H01H 11/0031 200/293 |
| 7,798,869 | B1 * | 9/2010 | Konopacki | H01R 4/363 439/812 |
| 7,907,389 | B2 | 3/2011 | Baird et al. | |
| 8,508,917 | B2 * | 8/2013 | Rus | H01H 9/042 174/67 |
| 9,748,673 | B1 * | 8/2017 | Kitatani | H01R 12/515 |
| 10,262,810 | B1 * | 4/2019 | Burkman | H01H 3/02 |
| 10,340,097 | B2 * | 7/2019 | Weber | H01R 4/38 |
| 2002/0081914 | A1 * | 6/2002 | Takaya | H01R 4/363 439/810 |
| 2004/0033730 | A1 * | 2/2004 | Oda | H01R 9/2491 439/709 |
| 2004/0102095 | A1 * | 5/2004 | Huang | H01R 13/6581 439/676 |
| 2005/0057333 | A1 * | 3/2005 | Subramanian | H01H 9/0264 335/202 |
| 2006/0030207 | A1 * | 2/2006 | Mertz | H01R 9/24 439/547 |
| 2006/0061441 | A1 * | 3/2006 | Whipple | H01H 71/08 335/132 |
| 2008/0102711 | A1 * | 5/2008 | Yang | H01R 33/02 439/660 |
| 2011/0228508 | A1 * | 9/2011 | Inuduka | H02M 7/003 361/811 |
| 2011/0269333 | A1 * | 11/2011 | Bussieres | H01R 13/6683 439/488 |
| 2012/0214321 | A1 * | 8/2012 | Kagimura | H01R 4/34 439/55 |
| 2013/0300222 | A1 * | 11/2013 | Nakano | H02K 3/50 310/43 |
| 2014/0357137 | A1 * | 12/2014 | Sian | H01R 13/187 439/843 |
| 2016/0028170 | A1 * | 1/2016 | Hyder | H01R 4/4845 439/462 |
| 2017/0324173 | A1 * | 11/2017 | Kotera | H01R 4/2429 |
| 2018/0062283 | A1 * | 3/2018 | Kitatani | H01R 9/24 |
| 2019/0131207 | A1 * | 5/2019 | Ezhilvalavan | H01L 23/3736 |

FOREIGN PATENT DOCUMENTS

| | | | |
|---|---|---|---|
| KR | 20090006393 U | * | 6/2009 |
| KR | 101138995 | | 4/2012 |

OTHER PUBLICATIONS

KR20090006392, Rear cover connector, Jun. 29, 2009, PE2E search translation (Year: 2009).*
KR20090006393, Rear cover connector, Jun. 29, 2009, PE2E search translation (Year: 2009).*
International Search Report (ISR) with Written Opinion for PCT/IB2019/061273 dated Jul. 23, 2020, pp. 1-9.
Examination Report dated Sep. 7, 2020, issued in corresponding Indian Application No. 201921003495, 5 pages.

* cited by examiner

| Circuit breaker capacity (A) | Ambient temp. (°C) | Temp. without secondary bracket (°C) | Temp. rise without secondary bracket (°C) | Ambient temp. (°C) | Temp. with secondary bracket (°C) | Temp. rise with secondary bracket (°C) |
|---|---|---|---|---|---|---|
| 110 | 21.1 | 83.4 | 62.3 | 23 | 71.84 | 48.84 |
| 125 | 23.1 | 72.3 | 49.2 | 22.5 | 64.5 | 42 |
| 150 | 23.1 | 83.2 | 60.1 | 22.5 | 67.3 | 44.8 |

FIG. 12

HEAT-ABSORBING-AND-DISSIPATING JACKET FOR A TERMINAL OF AN ELECTRICAL DEVICE

RELATED APPLICATIONS

This application claims priority to Indian Patent Application No. 201921003495 filed on Jan. 29, 2019 entitled "A HEAT-ABSORBING-AND-DISSIPATING JACKET FOR A TERMINAL OF AN ELECTRICAL DEVICE," the contents of which are incorporated by reference herein in their entirety.

FIELD

The present invention relates to means for heat absorption and dissipation in electrical assemblies.

BACKGROUND

The background information herein below relates to the present disclosure but is not necessarily prior art.

Electrical switch gear enclosures enclose electrical components such as circuit breakers, branch breakers, fuses, switches, contactors, ground fault interrupters and so on, and associated conductors, which are designed to handle high amplitudes of current. The electrical conductors and field wiring terminals in these components undergo significant heating due to Ohmic heat generation. Unless the heat is dissipated, the temperature at the point of heat generation in a circuit breaker, i.e., the terminals, and adjoining components can rise to alarming levels. Several international standardization systems lay down acceptance criterion of temperature at and around field terminals within a circuit breaker. The measured temperature rise at the field terminals is currently higher than the temperature rise limit sets set by the standardization systems. Such a temperature rise can damage current-responsive elements.

In explosion-proof sealed circuit breakers, terminals are enclosed in enclosures, thus preventing them from being exposed to any air movement that may prevail in the room where the enclosures are installed. Hence, the design of an electrical device, particularly in the region of maximum heat generation in the device, becomes crucial, in order to UM the criteria set by the international standards.

However, modification of an existing design of an electrical device becomes costly and time-consuming. Provision of heat-absorbing-and-dissipating arrays of fins is not possible in an enclosed design of a device such as a sealed enclosure containing circuit breakers, switches, fuses, etc. Provision of a cooling system utilizing vaporizing liquids and heat exchanging tubes, or even a current throttle device, would add to expenses.

Hence, there is need of a heat absorption and dissipation means for an electrical device which ameliorates the aforementioned issues.

OBJECTS

Some of the objects of the present disclosure, which at least one embodiment satisfies, are as follows:

A primary object of the present disclosure is to provide a heat absorption and dissipation means for an electrical device.

Another object of the present disclosure is to provide a heat absorption and dissipation means for a circuit breaker, which allows maximum heat absorption and dissipation from an enclosed electrical device.

Yet another object of the present disclosure is to provide a heat absorption and dissipation means for a circuit breaker, which can be incorporated in an existing design of an electrical device.

Still another object of the present disclosure is to provide a heat absorption and dissipation means for an electrical device, which ensures safety of the current-responsive elements.

Yet a further object of the present disclosure is to provide a heat absorption and dissipation means for an electrical device, which is cost-effective.

Other objects and advantages of the present disclosure will be more apparent from the following description, which is not intended to limit the scope of the present disclosure.

SUMMARY

The present disclosure envisages a heat-absorbing-and-dissipating jacket for a terminal of an electrical device. The jacket has a body configured to at least partially contour walls of the housing of the terminal and the jacket is made of a heat-absorbing-and-dissipating material.

In an embodiment, the body of the jacket has a lower portion extending operatively below the housing of the terminal. In another embodiment, the body of the jacket has an upper portion extending operatively above the housing of the terminal.

In an embodiment, the lower portion is integral with the body of the jacket. In another embodiment, the upper portion is integral with the body of the jacket.

In another embodiment, the lower portion is secured to the body.

In yet another embodiment, slits are defined in the lower portion and the upper portion to permit dissipation of air therethrough in an operative configuration of the jacket.

In still another embodiment, an opening is defined in an operative floor of the body of the jacket for passage of a screw for holding a conducting element of the terminal to the housing of the terminal.

In an embodiment, a roof is defined in the lower portion and the roof is provided with a hole which is coaxial with the opening in the floor of the housing of the terminal.

In another embodiment, fins are defined in the lower portion and the upper portion to aid heat absorption and dissipation.

In yet another embodiment, the jacket is U-shaped and contours both side-walls of the housing of the terminal. In still another embodiment, the jacket is S-shaped and contours only one side-wall of the housing of the terminal.

In an embodiment, the upper portion encompasses a screw of the terminal.

The present disclosure also envisages a terminal assembly for an electrical device having a heat-absorbing-and-dissipating jacket at least partially contouring the walls of the housing of the terminal.

BRIEF DESCRIPTION OF ACCOMPANYING DRAWING

FIG. 1A illustrates explosion-proof electrical enclosure;
FIG. 1B illustrates a zoomed-in view of FIG. 1;
FIG. 2A illustrates an isometric view of a circuit breaker;
FIG. 2B illustrates a top view of the circuit breaker of FIG. 2A;

FIG. 12 is a table showing temperature rise measured the on surface of terminal assemblies without and with the jacket of the present disclosure.

Figure 1A:
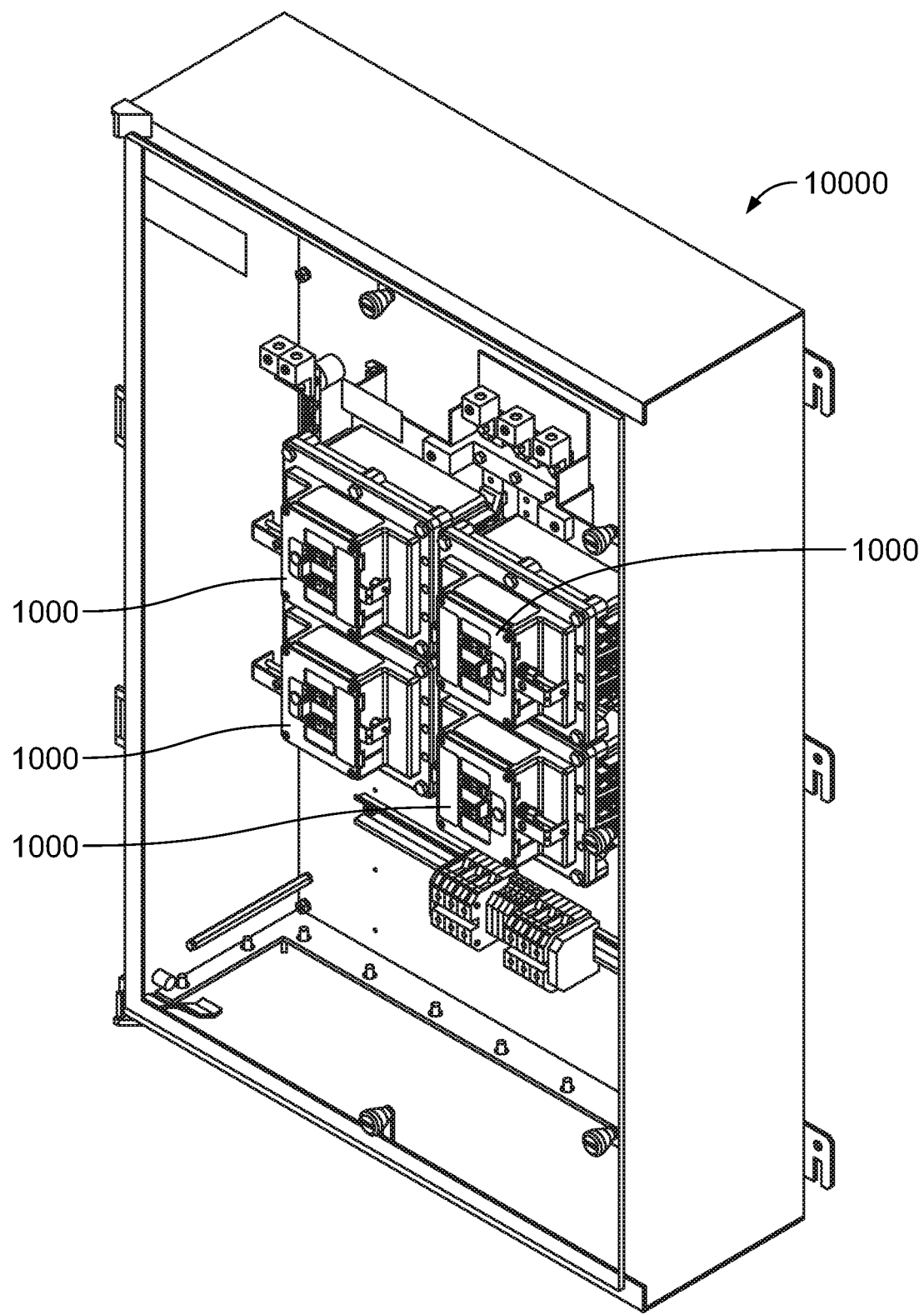

LIST OF REFERENCE NUMERALS 10000 enclosure
1000 electrical device (circuit breaker)
100 terminal assembly
10 housing
12 base of housing
14 side-wall of housing
16 roof of housing
20 first screw
22 first screw thread
24 first screw head
30 curved plate
40 second screw
50 second screw washer
60 first conducting element
70 second conducting element
80 jacket
81 body of jacket
82 floor of body of jacket
84 side-wall of body of jacket
85 opening of body of jacket
86 lower portion
860 roof of lower portion
861 opening of lower portion
862 side-wall of lower portion
863 slit of lower portion
864 fin of lower portion
865 window of lower portion
88 upper portion
880 floor of upper portion
881 slot of upper portion
882 side-wall of upper portion
883 slit of upper portion
884 fin of upper portion
885 clip-on arrangement of upper portion
200 partition wall
500 ON/OFF switch

DETAILED DESCRIPTION

Embodiments, of the present disclosure, will now be described with reference to the accompanying drawing.

Embodiments are provided so as to thoroughly and fully convey the scope of the present disclosure to the person skilled in the art. Numerous details are set forth, relating to specific components, and methods, to provide a complete understanding of embodiments of the present disclosure. It will be apparent to the person skilled in the art that the details provided in the embodiments should not be construed to limit the scope of the present disclosure. In some embodiments, well-known processes, well-known apparatus structures, and well-known techniques are not described in detail.

The terminology used, in the present disclosure, is only for the purpose of explaining a particular embodiment and such terminology shall not be considered to limit the scope of the present disclosure. As used in the present disclosure, the forms "a", "an" and "the" may be intended to include the plural forms as well, unless the context clearly suggests otherwise. The terms "comprises", "comprising", "including" and "having" are open-ended transitional phrases and therefore specify the presence of stated features, integers, steps, operations, elements, modules, units and/or components, but do not forbid the presence or addition of one or more other features, integers, steps, operations, elements, components, and/or groups thereof. The particular order of steps disclosed in the method and process of the present disclosure is not to be construed as necessarily requiring their performance as described or illustrated. It is also to be understood that additional or alternative steps may be employed.

When an element is referred to as being "mounted on", "engaged to", "connected to" or 'coupled to" another element, it may be directly on, engaged, connected or coupled to the other element. As used herein, the term "and/or" includes any and all combinations of one or more of the associated listed elements.

The terms first, second, third, etc., should not be construed to limit the scope of the present disclosure as the aforementioned terms may be only used to distinguish one element, component, region, layer or section from another component, region, layer or section. Terms such as first, second, third etc., when used herein do not imply a specific sequence or order unless clearly suggested by the present disclosure.

Terms such as "inner", "outer", "beneath", "below", "lower", "above", "upper" and the like, may be used in the present disclosure to describe relationships between different elements as depicted from the figures.

Results of various tests have shown that, with increasing current handling capacity of a circuit breaker, the ratio of measured temperature rise to theoretically predicted temperature rise goes on increasing. For circuit breakers with this ratio above a certain threshold, provision of an additional heat absorption and dissipation means becomes essential. Incorporating a separate heat absorption and dissipation means in an existing circuit breaker design would save significant R&D and production costs.

Figure 1B:
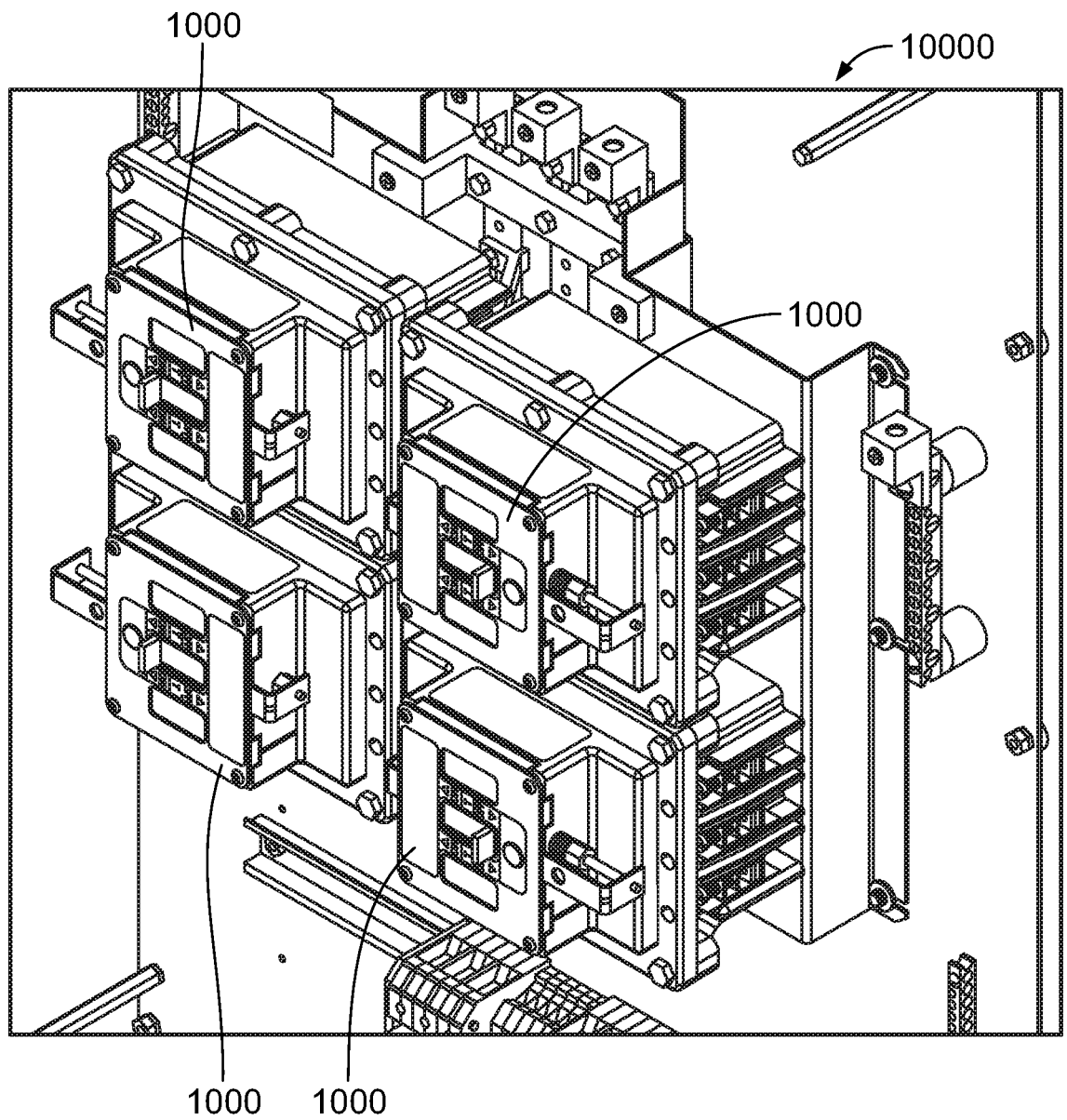
Figure 2A:
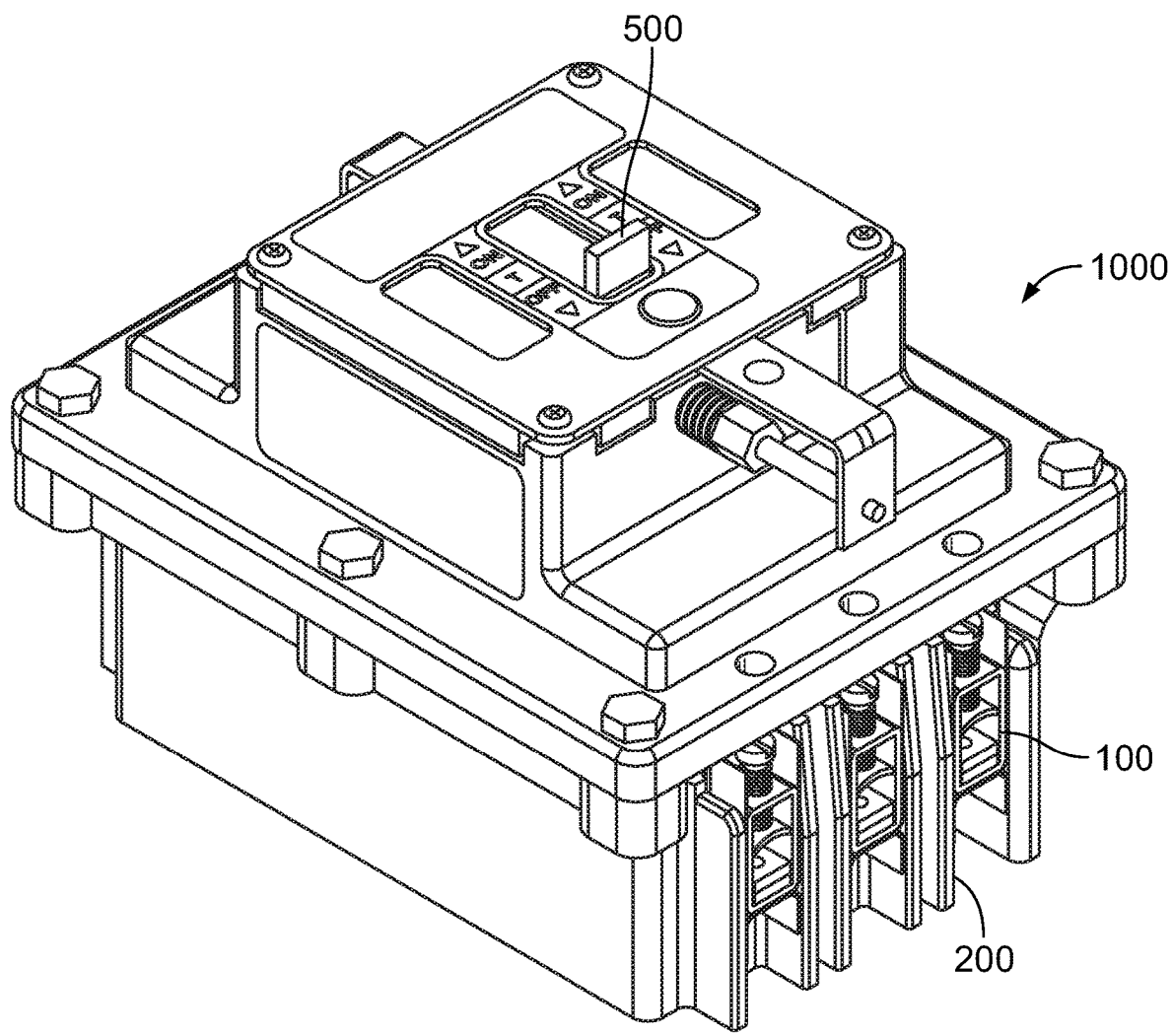
FIG. 2C illustrates a side view of the circuit breaker of FIG. 2A.
Figure 2B:
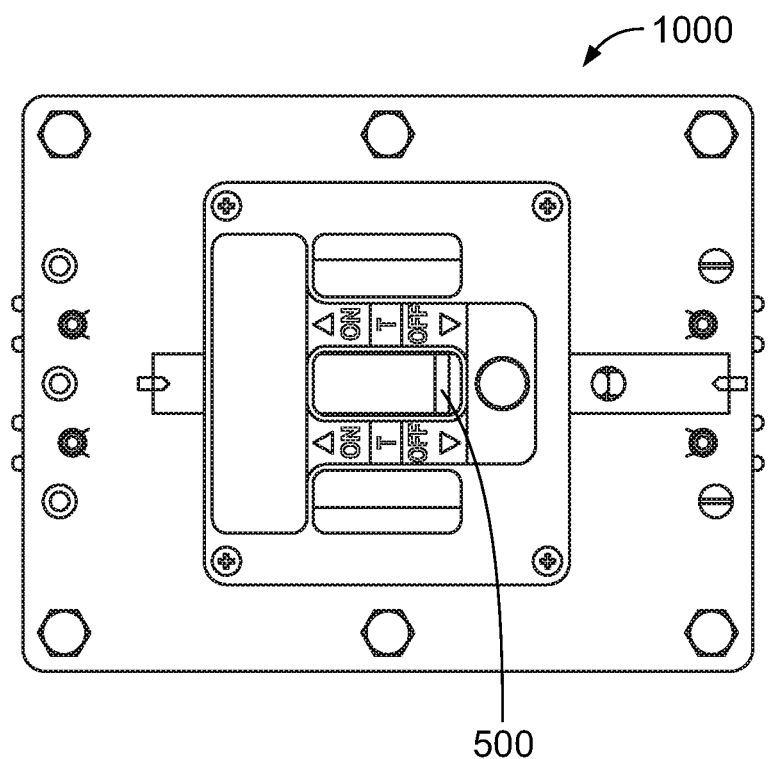
Figure 2C:
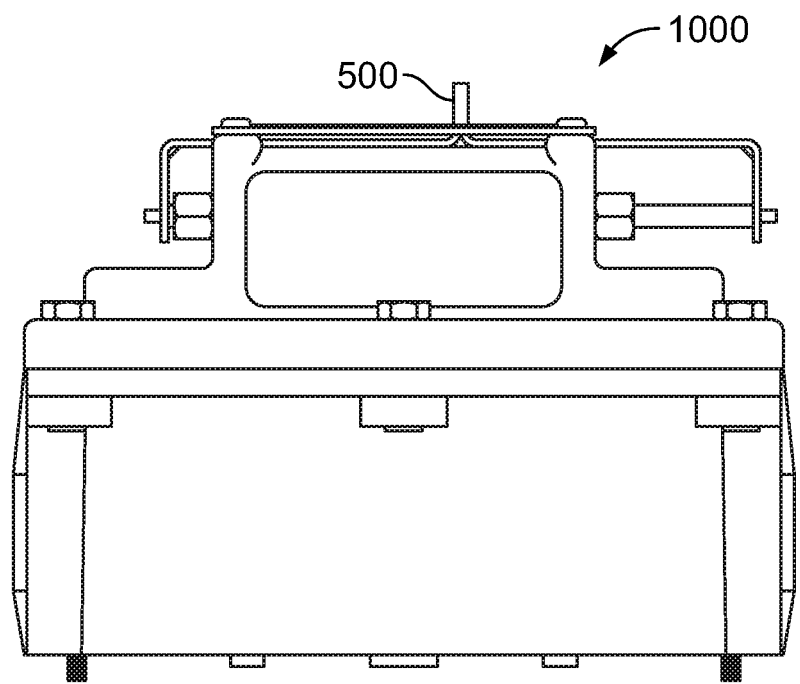

A typical industrial explosion-proof electrical enclosure 10000 shown in FIGS. 1A and 1B comprises a plurality of electrical devices such as a circuit breaker 1000. Each circuit breaker 1000 is provided with an ON/OFF switch 500, as shown in the isometric view in FIG. 2A and the top view in FIG. 2B. A circuit breaker 1000 typically comprises a plurality of electrical field terminal assemblies as shown in the side view in FIG. 3A and FIG. 3B. One such terminal assembly 100' of prior art is illustrated in FIG. 4. Each terminal assembly 100' electrically connects a first electrical conducting element 60 and a second conducting element 70, wherein the first electrical conducting element 60 is coupled with the breaker 1000 and the second conducting element extends 70 out of the breaker 1000.

Figure 3A:
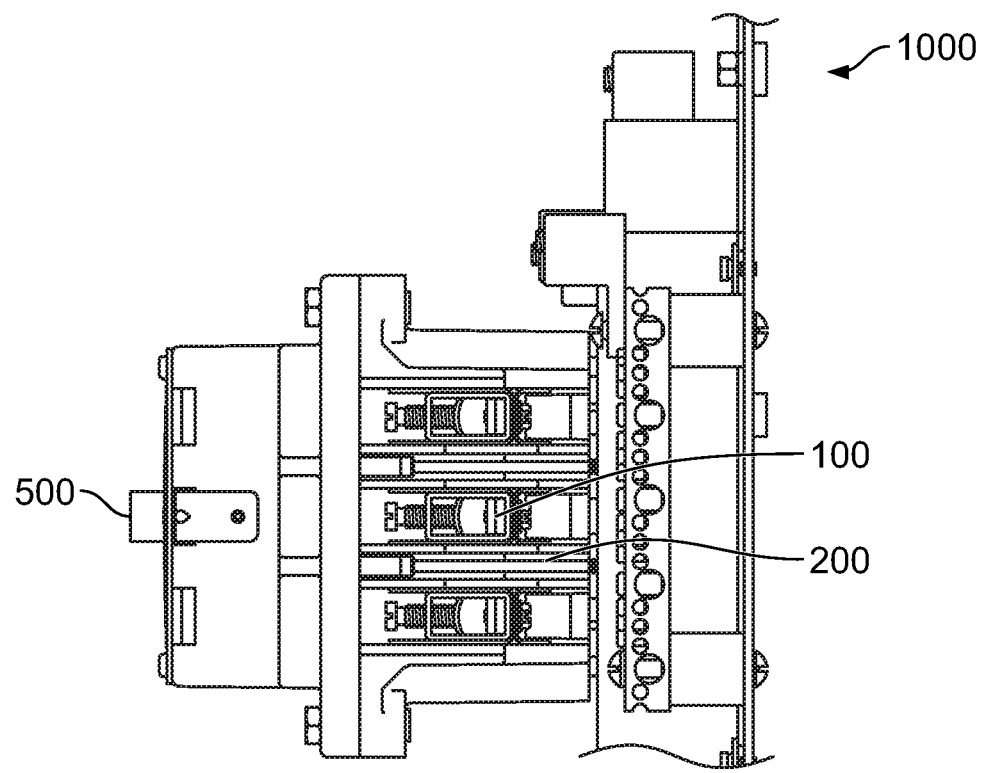
FIG. 3A illustrates a side-view of a circuit breaker in an operative horizontal configuration.
Figure 3B:
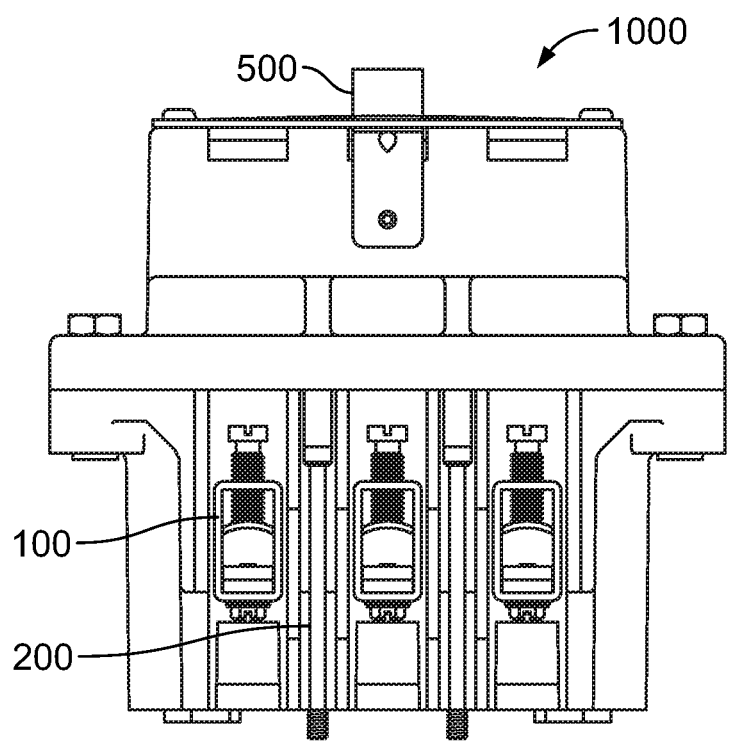
FIG. 3B illustrates a side-view of a circuit breaker in an operative vertical configuration.
Figure 4:
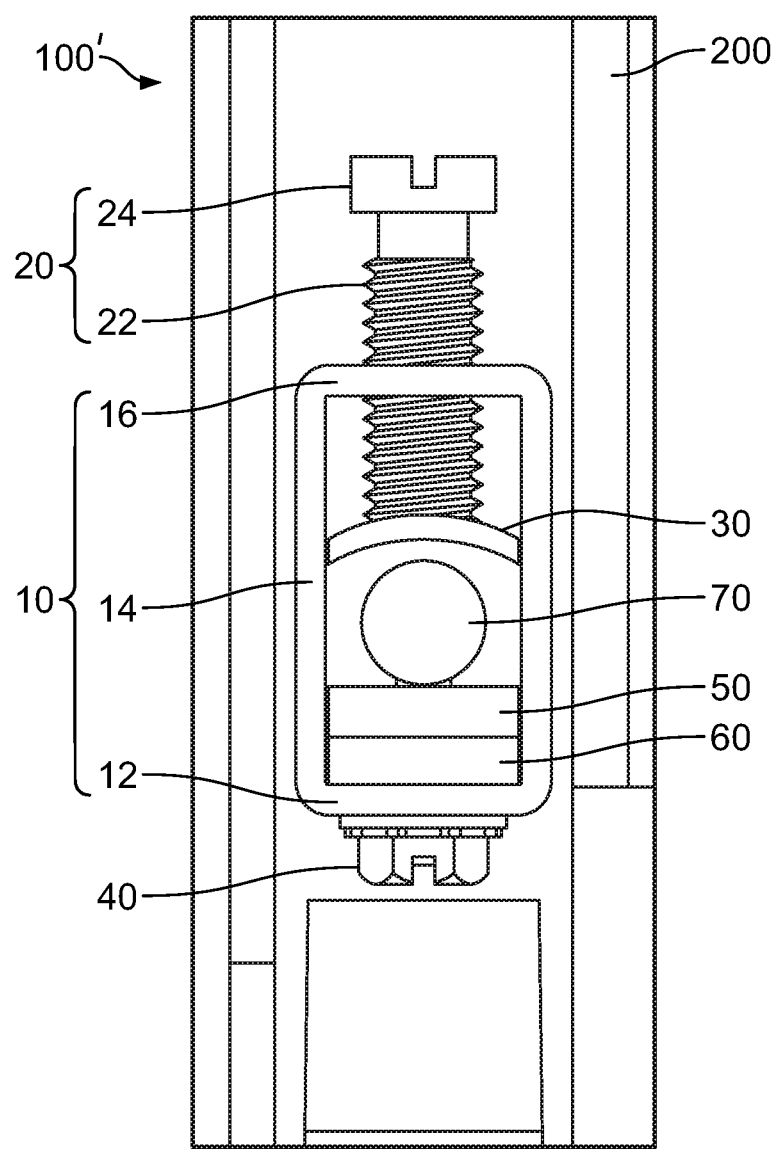
FIG. 4 illustrates a terminal assembly of a prior art.

The terminal assembly 100' can be mounted in a horizontal operative configuration shown in FIG. 3A or a vertical operative configuration shown in FIG. 3B. As shown in the vertical operative configuration of FIG. 3B, the terminal assembly 100' is provided between two partition walls 200 of the housing of the circuit breaker 1000. The terminal assembly 100' comprises of a housing 10, the housing 10 being defined by a floor 12, a roof 16 and at least one side-wall 14 connecting the floor 12 and the roof 16 thereof. A first screw 20, comprising threads 22 and a head 24, passes through the roof 16 of the housing 10. The first screw 20 is provided with a curved plate 30, the curved plate 30 being rotatably coupled at the operative bottom of the first screw 20. The first screw 20 with the curved plate 30 forms a clamping mechanism together with the floor 12 of the housing 10. The free end of the first conducting element 60 is coupled with the housing 10 with the help of a second screw 40 and a washer 50, wherein the second screw 40 is passed through the floor 12 of the housing 10 and the washer 50 is placed above the free end of the first conducting element 60. The free end of the second conducting element 70 is held in contact with the washer 50. Hence, the first screw 20 is rotated in a suitable direction in order to lower the curved plate 30 coupled to its operative bottom. As the curved plate 30 is lowered, the curved plate 30 comes into contact with the second conducting element 60. The second conducting element 60 is pushed further operatively downwards. Thus, the free ends of the conducting elements 60, 70 inserted between the floor 12 of the housing 10 and the curved plate 30 of the first screw 20 are held firmly in place and brought in electrical conducting contact through the washer 50, and the terminal assembly 100 is completed. The electrical circuit is completed, while the ON/OFF, switch 500 of the breaker 1000 is in an ON position.

In an instance of overload current flowing through the terminal assembly 100', the contact portion in the terminal assembly 100, i.e., the region where the two conducting elements 60, 70 come into electrical contact with each other gets heated and temperature thereof rises.

The present disclosure envisages a heat-absorbing-and-dissipating jacket 80 attached to the housing 10 of the terminal assembly 100 of an electrical device 1000 as illustrated in the various embodiments shown in FIGS. 5A-10C. The electrical device is a circuit breaker in the illustrated embodiments, although the heat-absorbing-and-dissipating jacket of the present disclosure is applicable to terminal assemblies in electrical devices such as a contactor, a fuse, an overload relay, a switch and the like. The jacket 80 is configured to at least partially contour the walls, including the side-walls 14, the floor 12 and the roof 16, of the housing 10 of the terminal 100. Thus, in the embodiments shown in FIGS. 6A-11C, the jacket 80 contours the floor 12 of the housing 10. In the embodiments shown in FIGS. 6A-10C, the jacket 80 contours the side-walls 14 of the housing 10. In the embodiments shown in FIGS. 6A-11C, the jacket 80 contours the roof 16 of the housing 10 at least partially. The jacket 80 is made of a heat-absorbing-and-dissipating material. The material of the jacket 80 is selected from a group consisting of aluminium, copper, stainless steel, and the like. The jacket 80 is made out of sheet metal bent into the desired shape. In another embodiment, the jacket is made from a metallic material using a method selected from a group consisting of casting, machining, welding, pressing and the like, or using a non-metal using moulding, forming, machining, and the like, provided that the material has the desired heat-absorbing-and-dissipating properties. The jacket comprises a body 81, wherein the body 81 has a floor 82 and at least one side-wall 84.

In an embodiment, the body 81 of the jacket 80 has a lower portion 86 extending operatively below the body 81. The lower portion 86 is defined by a roof 861 and side-walls 862. In an embodiment as illustrated in FIGS. 6A-C and 7A-C, the lower portion 86 is secured to the body 81 by means of a suitable method selected from a group consisting of spot welding, seam welding, fusion welding, using a thermal adhesive and the like. An opening 861 is defined in the roof 860 of the lower portion 86 for passing the second screw 40 therethrough, so that the lower portion 86 is secured with the housing 10. In another embodiment as illustrated in FIGS. 9A-C and 10A-C, the lower portion 86 is integral with the body 81. In an embodiment as shown in FIGS. 6A-C, 7A-C and 8A-C, slits 863 are defined in side-walls 862 of the lower portion 86 to permit dissipation of air therethrough in an operative configuration of the jacket 80. Further, fins 864 are defined in the side-walls 862 to aid dissipation of heat. Alternatively, windows 865 are defined in the side-walls 862 as shown in FIGS. 9A-C and 10A-C.

Figure 7A:
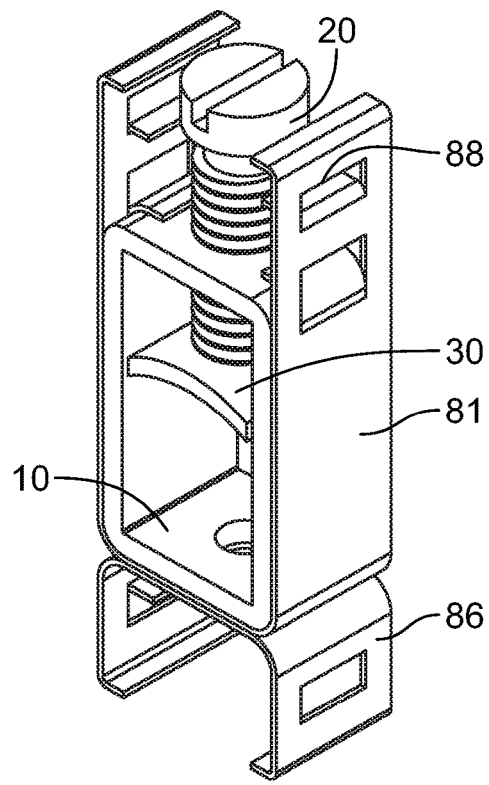
FIG. 7A illustrates an isometric view of a terminal assembly of another embodiment of the present disclosure.
Figure 7B:
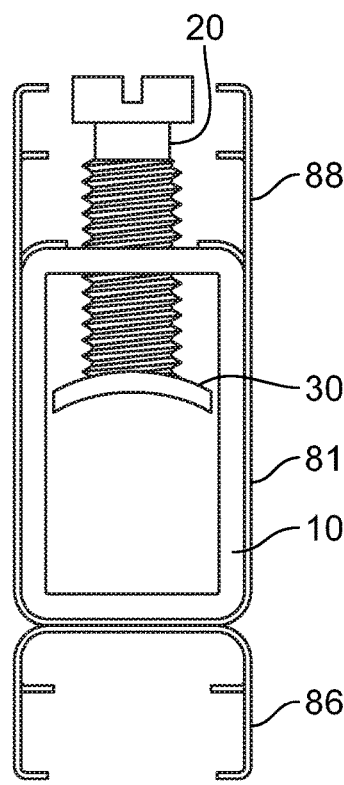
FIG. 7B illustrates a front view of the terminal assembly of FIG. 7A.
Figure 7C:
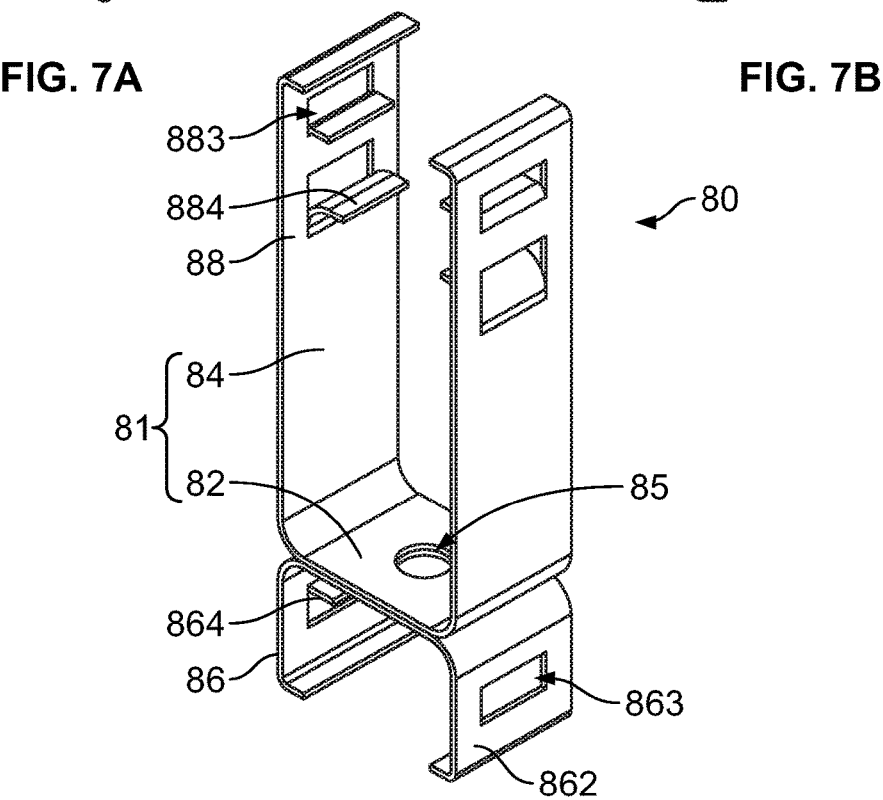
FIG. 7C illustrates an isometric view of the jacket of FIG. 7A.
Figure 8A:
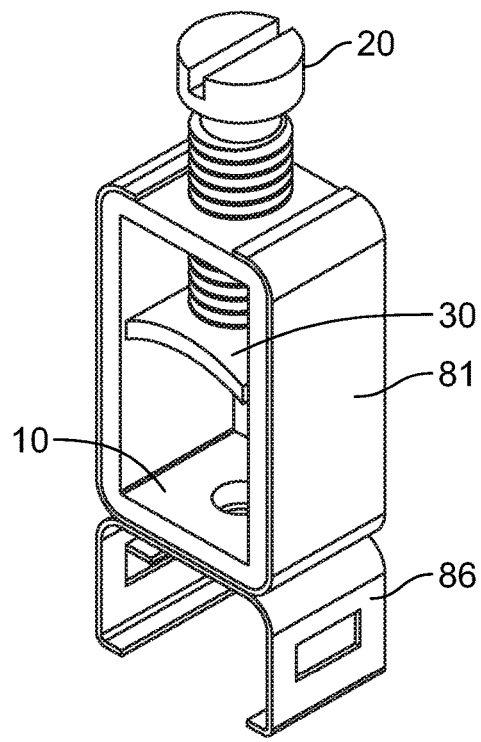
FIG. 8A illustrates an isometric view of a terminal assembly of yet another embodiment of the present disclosure.
Figure 8B:
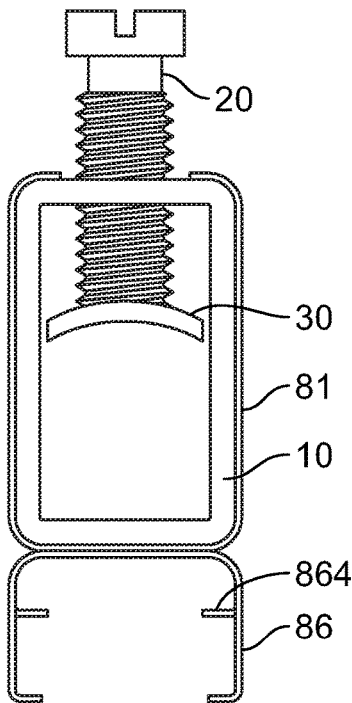
FIG. 8B illustrates a front view of the terminal assembly of FIG. 8A.
Figure 8C:
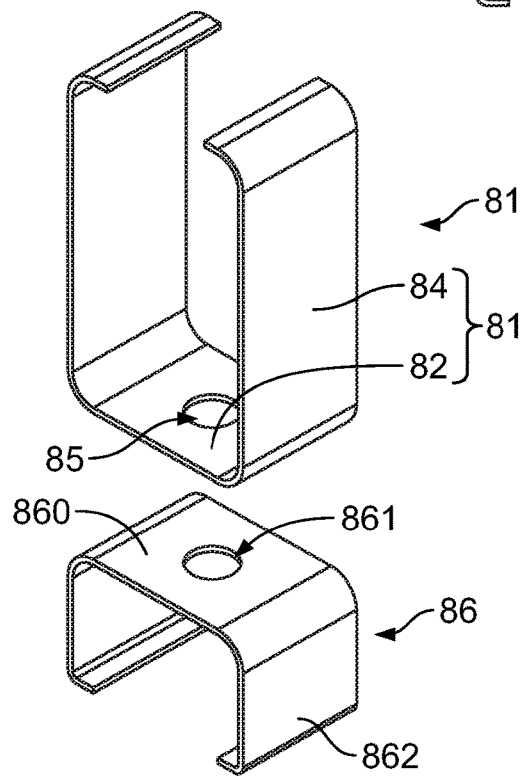
FIG. 8C illustrates an isometric view of the jackets of FIG. 8A.
Figure 9A:
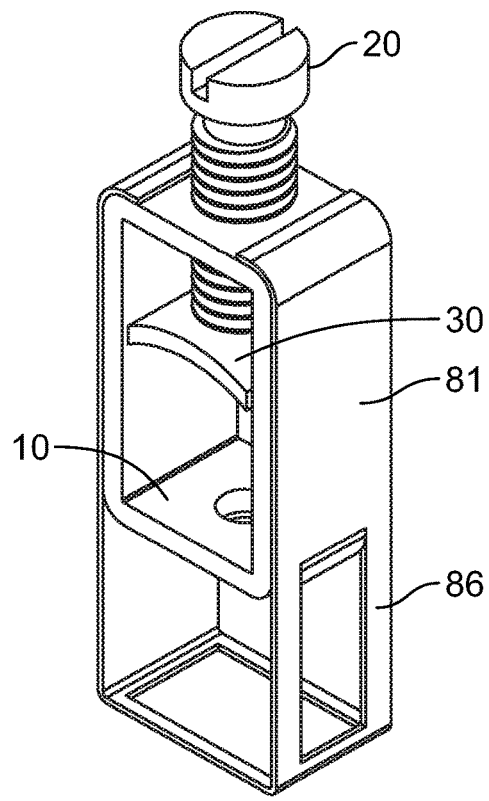
FIG. 9A illustrates an isometric view of a terminal assembly of still another embodiment of the present disclosure.
Figure 9B:
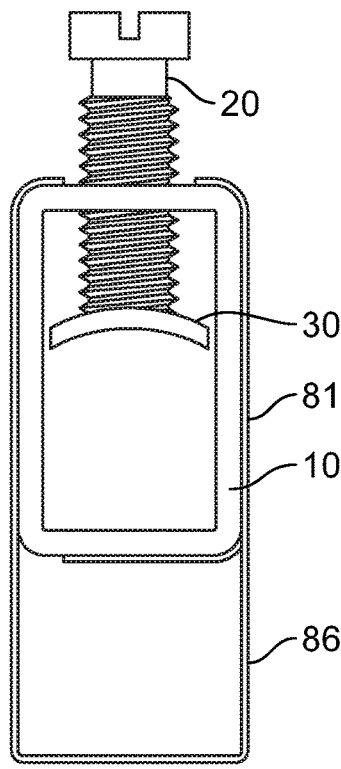
FIG. 9B illustrates a front view of the terminal assembly of FIG. 9A.
Figure 9C:
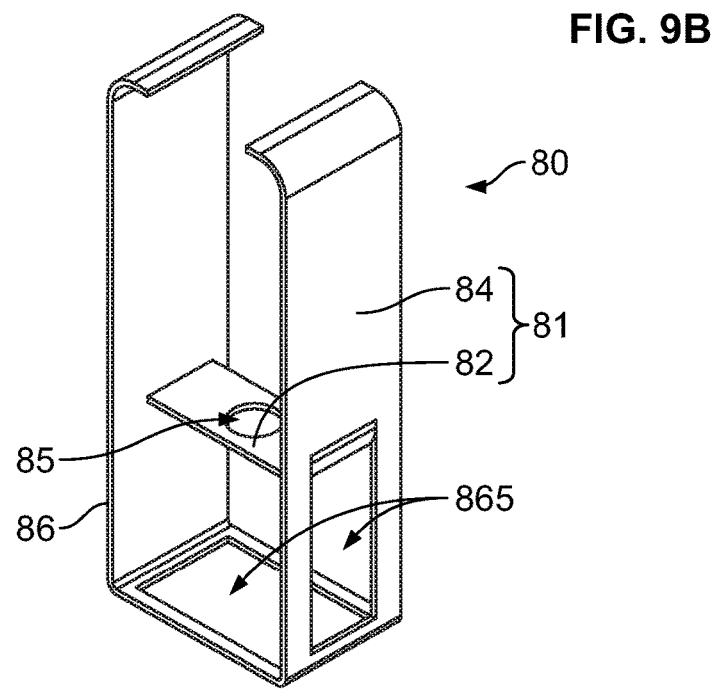
FIG. 9C illustrates an isometric view of the jacket of FIG. 9A.

In an embodiment, the body 81 of the jacket 80 has an upper portion 88 extending operatively above the body 81. The upper portion 88 is defined by side walls 882. Moreover, the upper portion 88 encompasses portion of the first screw 20 of the terminal 100 that is exterior to the housing 10. As illustrated in FIGS. 6A-C and 7A-C, the upper portion 86 is integral with the body 81. In an embodiment as shown in FIGS. 7A-C, slits 883 are defined in side-walls 882 of the upper portion 88 to permit dissipation of air therethrough in an operative configuration of the jacket 80. Further, fins 884 are defined in the side-walls 882 to aid dissipation of heat.

In an embodiment, the fins 864, 884 are formed by bending the corresponding 'flap' portion of the slits 863, 883 inwards of the jacket 80, as illustrated in FIGS. 6A-8C.

Figure 10A:
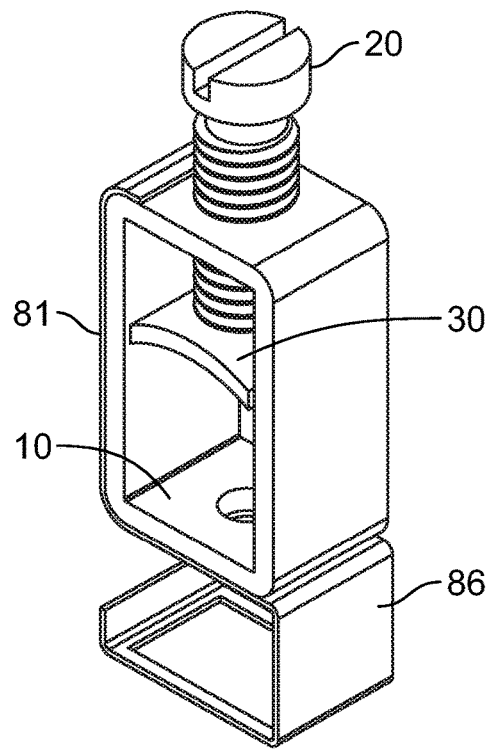
FIG. 10A illustrates an isometric view of a terminal assembly of yet another embodiment of the present disclosure.
Figure 10B:
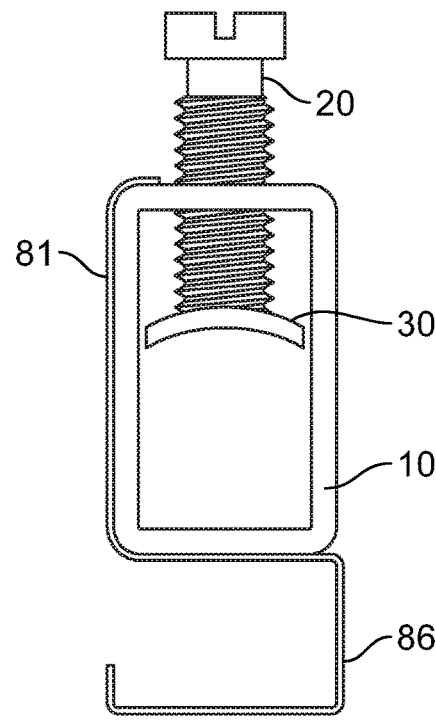
FIG. 10B illustrates a front view of the terminal assembly of FIG. 10A.
Figure 10C:
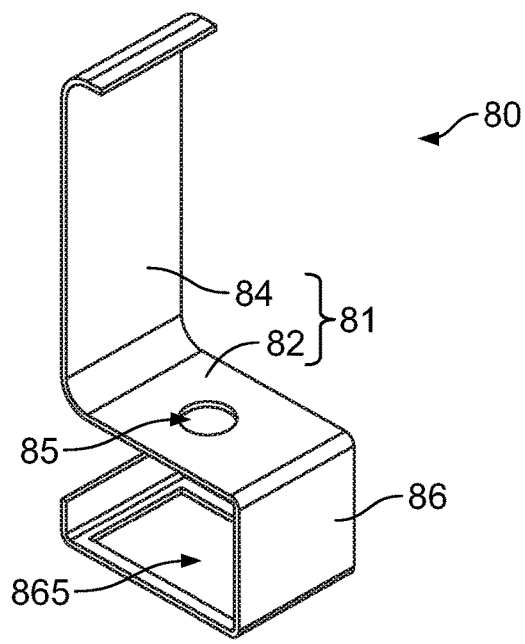
FIG. 10C illustrates an isometric view of the jacket of FIG. 10A.

In an embodiment, the jacket 80 is U-shaped and contours both side-walls 14 of the housing 10 of the terminal 100, as illustrated in FIGS. 6A-9C. In another embodiment, the jacket 80 is S-shaped and contours only one side-wall 14 of the housing 10 of the terminal 100, as illustrated in FIGS. 10A-C. Alternatively, the jacket 80 is made out of any shape which contours the housing 10 of the terminal 100 as well as provides a lower portion 86 for ensuring adequate heat absorption and dissipation from the terminal 100.

Figure 11A:
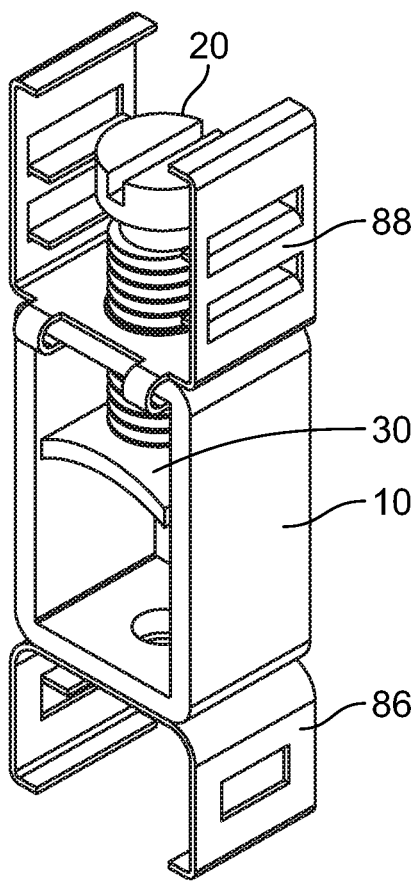
FIG. 11A illustrates an isometric view of a terminal assembly of still another embodiment of the present disclosure.
Figure 11B:
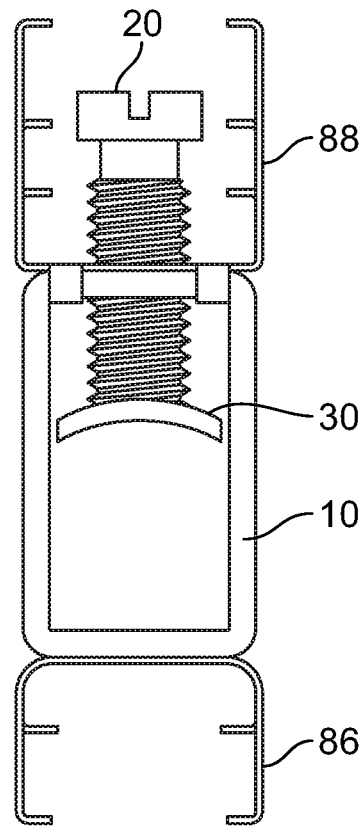
FIG. 11B illustrates a front view of the terminal assembly of FIG. 11A.
Figure 11C:
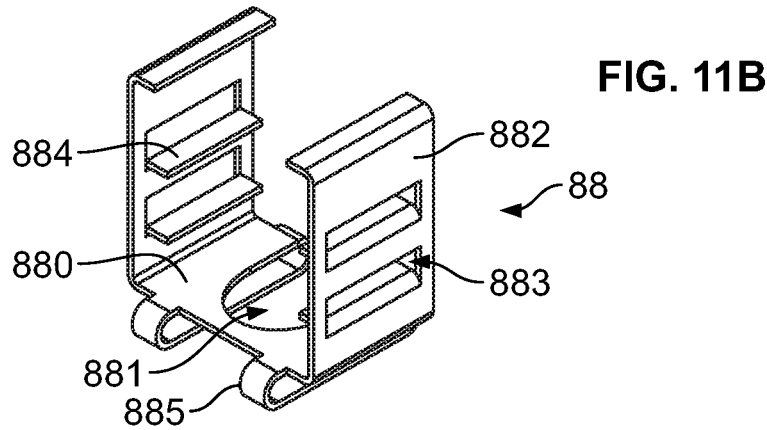
FIG. 11C illustrates an isometric view of the jackets of FIG. 11A.
Figure 11C:
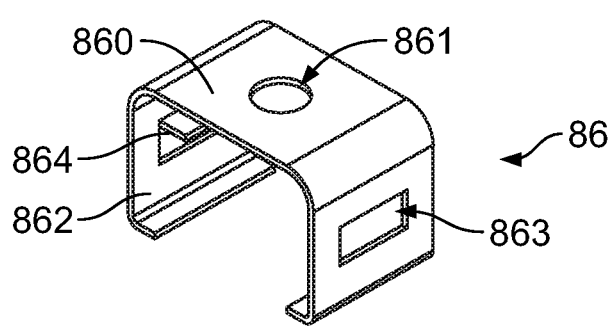

In another embodiment as illustrated in FIGS. 11A-C, the heat-absorbing-and-dissipating jacket 80 comprises a lower portion and an upper portion 88, wherein the jacket 80 is devoid of a body portion. The lower portion 86 is defined by a roof 861 and side-walls 862. An opening 861 is defined in the roof 860 of the lower portion 86 for passing the second screw 40 therethrough, so that the lower portion 86 is secured to the floor 12 of the housing 10. A slot 881 is defined in the floor 880 of the upper portion 88 for passing the first screw 40 therethrough. The upper portion 88 is provided with a clip-on arrangement 885 for securing the upper portion 88 on the roof 16 of the housing 10 of the terminal 100, as shown in FIGS. 11A-C.

Figure 5A:
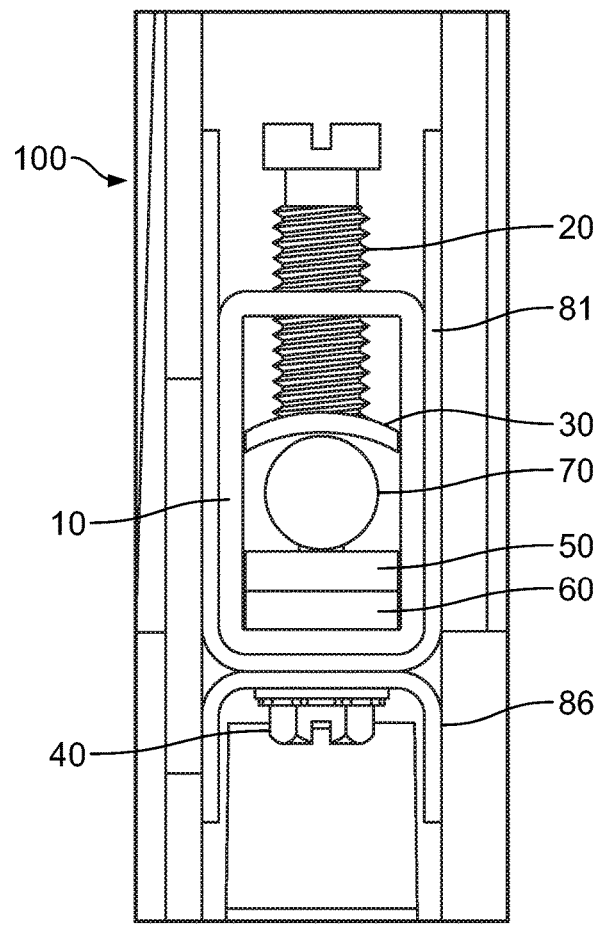
FIG. 5A illustrates an isometric view of a terminal assembly according to an embodiment of the present disclosure.
Figure 5B:
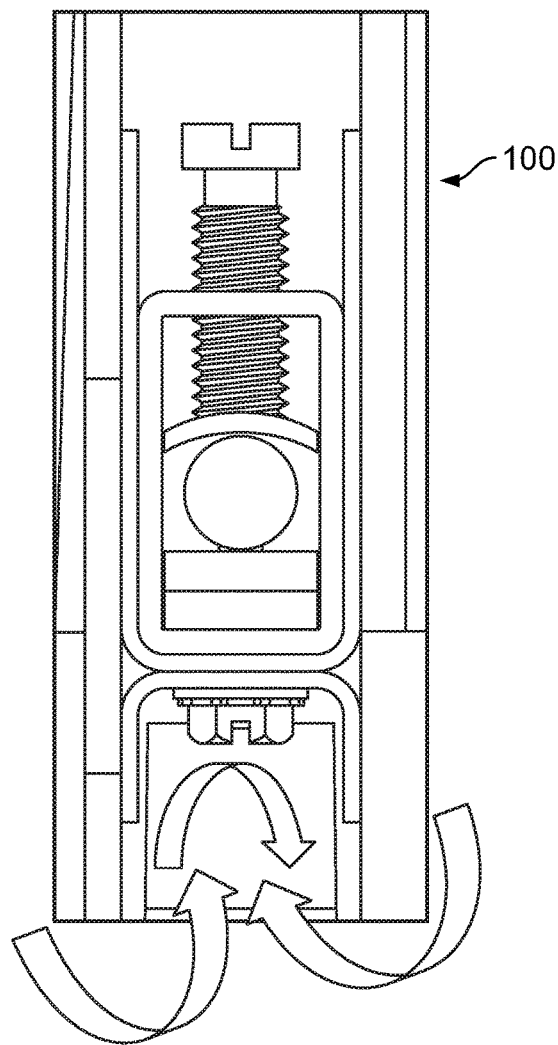
FIG. 5B illustrates a front view of a terminal assembly.
Figure 6A:
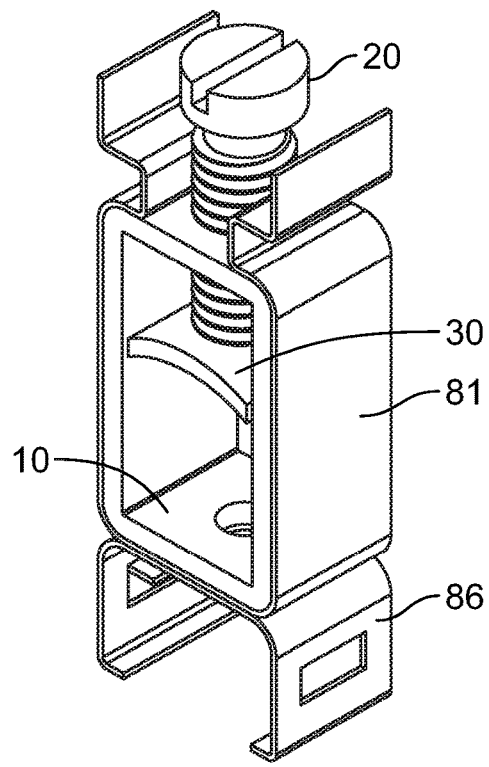
FIG. 6A illustrates an isometric view of a terminal assembly of an embodiment of the present disclosure.
Figure 6B:
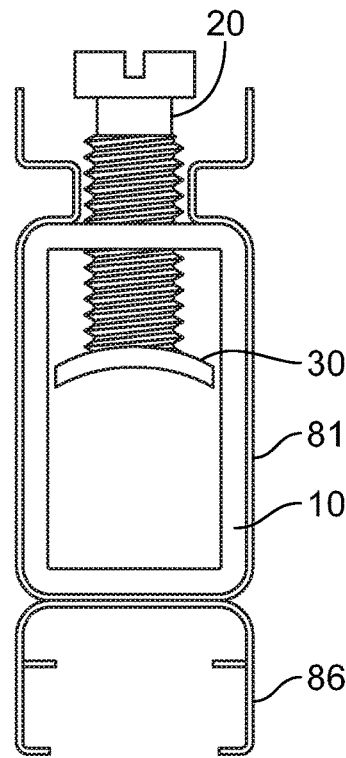
FIG. 6B illustrates a front view of the terminal assembly of FIG. 6A.
Figure 6C:
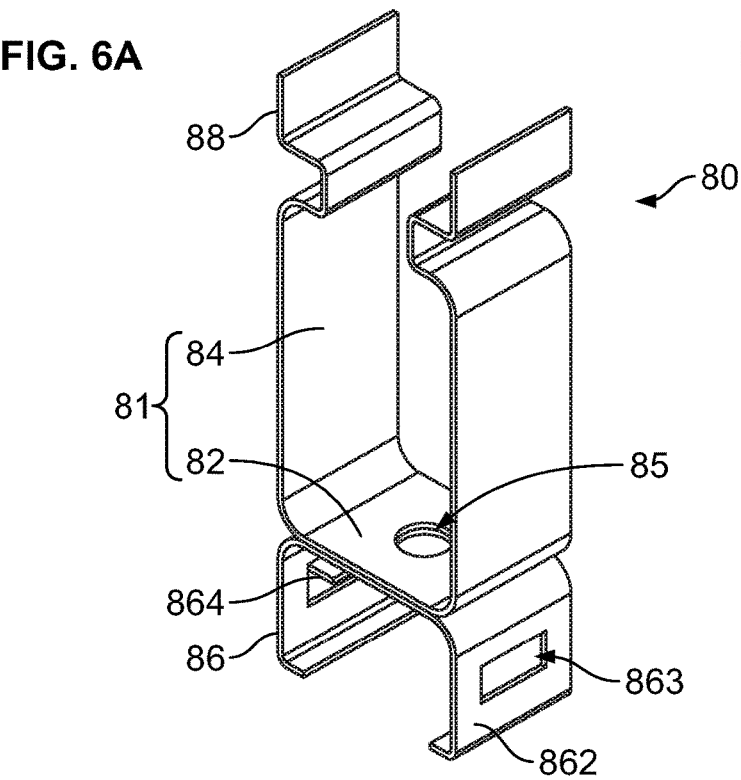
FIG. 6C illustrates an isometric view of the jacket of FIG. 6A.

When excessive load current flows through the conductor elements 60, 70, heat is generated therein, which primarily gets conducted through the clamping mechanism, including the second screw 40 and the washer 50 to the floor 12 and lower part of the side-walls 14 of the housing 10. Thereafter, the heat is conducted into the side-walls 84 and the lower extension 86 of the jacket 80. Thus, the jacket 80 is configured to absorb maximum possible heat from the terminal 100. In an operative configuration, shown in FIG. 3A, when the circuit breaker 1000 is wall-mounted inside the electrical enclosure 10000, the terminal assembly 100 extends horizontally. In this configuration, the volume of air in contact with the side-wall 84 of the jacket 80 absorbs heat from the jacket 80 and moves upwards while pushing colder and heavier air downwards. Thus, through this convection phenomenon, the jacket 80 dissipates heat to the air inside the enclosure 10000. Nevertheless, the air flow pattern around the lower extension of the jacket as shown in FIG. 5B is also another mechanism for heat exchange that can exist. Also, the slits and the fins provided in the side-walls enhance heat exchange by promoting convective air motion without compromising on available surface area for heat exchange. By providing the jacket 80 of the present disclosure, the surface area of the terminal assembly 100 is increased. Hence, heat transfer rate increases and hence, lower temperature rises are recorded as compared to the conventional terminal assembly of FIG. 4.

The numerous temperature measurements taken on surface of the terminal assemblies of circuit breakers for various current ratings within the range of 100 A-150 A are shown in the table of FIG. 12. Without the heat dissipating jacket, temperature rise on the surface of the terminal assembly crosses 60° C. for the circuit breakers of 100 A and 150 A rated current. Nevertheless, the applicability of the jacket of the present disclosure extends beyond the range of the ampere ratings for which the aforementioned measurements were taken, and the jacket is equally applicable for a variety of electrical devices such as a contactor, a fuse, an overload relay, a switch and the like. When the jacket of the present disclosure is used with the housing of the terminal assembly of a circuit breaker, the temperature difference measured on the surface of terminal assembly does not exceed the specified limit of 60° C. Thus, the terminal assembly of the present disclosure satisfies with the stipulated criteria by the international standards, such as CSA Standard C22.2 No. 29-11, IEC/ATEX Standard, Russian Standard, UL Standard and different temperature rise clauses from other standards too.

The foregoing description of the embodiments has been provided for purposes of illustration and not intended to limit the scope of the present disclosure. Individual components of a particular embodiment are generally not limited to that particular embodiment, but, are interchangeable. Such variations are not to be regarded as a departure from the present disclosure, and all such modifications are considered to be within the scope of the present disclosure.

Technical Advancements

The present disclosure described herein above has several technical advantages including, but not limited to, the realization of a heat-absorbing-and-dissipating jacket for a terminal assembly of an electrical device, which:

allows maximum heat absorption and dissipation from an enclosed electrical device;

can be incorporated in an existing design of an electrical device;

ensures safety of the current-responsive elements; and is cost-effective.

The foregoing disclosure has been described with reference to the accompanying embodiments which do not limit the scope and ambit of the disclosure. The description provided is purely by way of example and illustration.

The embodiments herein and the various features and advantageous details thereof are explained with reference to the non-limiting embodiments in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The foregoing description of the specific embodiments so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

The use of the expression "at least" or "at least one" suggests the use of one or more elements or ingredients or quantities, as the use may be in the embodiment of the disclosure to achieve one or more of the desired objects or results.

Any discussion of documents, acts, materials, devices, articles or the like that has been included in this specification is solely for the purpose of providing a context for the disclosure. It is not to be taken as an admission that any or all of these matters form a part of the prior art base or were common general knowledge in the field relevant to the disclosure as it existed anywhere before the priority date of this application.

The numerical values mentioned for the various physical parameters, dimensions or quantities are only approximations and it is envisaged that the values higher/lower than the numerical values assigned to the parameters, dimensions or quantities fall within the scope of the disclosure, unless there is a statement in the specification specific to the contrary.

While considerable emphasis has been placed herein on the components and component parts of the preferred embodiments, it will be appreciated that many embodiments can be made and that many changes can be made in the preferred embodiments without departing from the principles of the disclosure. These and other changes in the preferred embodiment as well as other embodiments of the disclosure will be apparent to those skilled in the art from the disclosure herein, whereby it is to be distinctly understood that the foregoing descriptive matter is to be interpreted merely as illustrative of the disclosure and not as a limitation.

I claim:

1. A heat-absorbing-and-dissipating jacket for a terminal of an electrical device, said jacket having a body with an upper portion and a lower portion, the upper portion configured to contour an entire length of walls of a housing of said terminal and being made of a heat-absorbing-and-dissipating material;
   wherein said body of said jacket has the lower portion, separate from the upper portion of the body, and extending operatively below said housing of said terminal.

2. The heat-absorbing-and-dissipating jacket as claimed in claim 1, wherein said body of said jacket has the upper portion, separate from the lower portion, extending operatively above the housing of the terminal.

3. The heat-absorbing-and-dissipating jacket as claimed in claim 1, wherein said lower portion is secured to said upper portion of said body.

4. The heat-absorbing-and-dissipating jacket as claimed in claim 2, wherein slits are defined in said lower portion and said upper portion to permit dissipation of air therethrough in an operative configuration of said jacket.

5. The heat-absorbing-and-dissipating jacket as claimed in claim 1, wherein an opening is defined in an operative floor of said body of said jacket for passage of a screw for holding a conducting element of the terminal to said housing of said terminal.

6. The heat-absorbing-and-dissipating jacket as claimed in claim 5, wherein a roof is defined in said lower portion and said roof is provided with an opening which is coaxial with the opening in the floor of said body of said jacket and coaxial with an opening in a floor of said terminal.

7. The heat-absorbing-and-dissipating jacket as claimed in claim 2, wherein fins are defined in said lower portion and said upper portion to aid heat absorption and dissipation.

8. The heat-absorbing-and-dissipating jacket as claimed in claim 1, wherein said jacket is U-shaped and contours both side-walls of said housing of said terminal.

9. The heat-absorbing-and-dissipating jacket as claimed in claim 2, wherein said upper portion encompasses a screw of said terminal.

10. The heat-absorbing-and-dissipating jacket as claimed in claim 1, wherein a screw extends through a roof of the lower portion to secure a washer and a first conducting element between a floor of the housing and a second conducting element.

11. A heat-absorbing-and-dissipating jacket for a terminal of an electrical device, said jacket having body configured to contour an entire length of a side-wall of a housing of said terminal, and an entire length of a bottom of the housing and being made of a heat-absorbing-and-dissipating material, wherein said jacket is S-shaped and contours only one side-wall and the bottom of said housing of said terminal.

* * * * *